(12) United States Patent
Mutya et al.

(10) Patent No.: US 8,738,021 B2
(45) Date of Patent: May 27, 2014

(54) MOBILE DEVICE TUNE AWAY PERIODS

(75) Inventors: Subbarayudu Mutya, Hyderabad (IN);
Debesh Kumar Sahu, Hyderabad (IN);
Ling Hang, San Diego, CA (US);
Chih-Ping Hsu, San Diego, CA (US);
Shawn C. Morrison, Boulder, CO (US)

(73) Assignee: Qualcomm Incorporated, San Diego, CA (US)

( * ) Notice: Subject to any disclaimer, the term of this patent is extended or adjusted under 35 U.S.C. 154(b) by 12 days.

(21) Appl. No.: 13/355,767

(22) Filed: Jan. 23, 2012

(65) Prior Publication Data

US 2013/0023275 A1    Jan. 24, 2013

Related U.S. Application Data

(60) Provisional application No. 61/498,881, filed on Jun. 20, 2011.

(51) Int. Cl.
*H04W 72/00*    (2009.01)

(52) U.S. Cl.
USPC ...................................... 455/452.1

(58) Field of Classification Search
USPC ........ 455/558, 458, 452.1, 552.1, 435.1, 557, 455/414.1, 574, 12.1, 411; 370/332, 338, 370/329, 316; 380/270
See application file for complete search history.

(56) References Cited

U.S. PATENT DOCUMENTS

| 2003/0181216 A1 | 9/2003 | Tsai et al. | |
| 2008/0064443 A1* | 3/2008 | Shin et al. | 455/558 |
| 2009/0156257 A1 | 6/2009 | Shi | |
| 2009/0215473 A1* | 8/2009 | Hsu | 455/458 |
| 2010/0093349 A1 | 4/2010 | Gandhi et al. | |
| 2010/0167756 A1 | 7/2010 | Park et al. | |
| 2011/0130100 A1 | 6/2011 | Chen et al. | |
| 2011/0217969 A1 | 9/2011 | Spartz et al. | |
| 2011/0223942 A1 | 9/2011 | Xu et al. | |
| 2011/0237261 A1 | 9/2011 | Meshkati et al. | |
| 2012/0264390 A1* | 10/2012 | Clevorn et al. | 455/313 |

FOREIGN PATENT DOCUMENTS

| EP | 1499144 A1 | 1/2005 |
| GB | 2485433 A | 5/2012 |

OTHER PUBLICATIONS

International Search Report and Written Opinion - PCT/US2012/042531 - Isa/Epo - 2012-09-10 (111924W0).

* cited by examiner

*Primary Examiner* — Kiet Doan
(74) *Attorney, Agent, or Firm* — S. Hossain Beladi

(57) ABSTRACT

A particular method includes receiving first data via a first network at a device that is configured to receive the first data via the first network based on a first wireless communication subscription and is configured to receive second data via a second network based on a second wireless communication subscription. The method also includes while receiving the first data, determining that a tuneaway period associated with the second network has passed, where the tuneaway period is longer than a discontinuous reception (DRX) cycle length associated with the second network. The method further includes tuning a receiver of the device to a paging channel of the second network in response to passing of the tuneaway period.

22 Claims, 6 Drawing Sheets

US 8,738,021 B2

MOBILE DEVICE TUNE AWAY PERIODS

CLAIM OF PRIORITY

The present application claims priority from U.S. provisional patent application No. 61/498,881 filed on Jun. 20, 2011 and entitled "MOBILE DEVICE TUNE AWAY PERIODS," the contents of which are expressly incorporated herein by reference in their entirety.

FIELD

The present disclosure relates to mobile communication devices and systems.

BACKGROUND

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Many such wireless telephones incorporate additional devices to provide enhanced functionality for end users. For example, a wireless telephone can also include a digital still camera, a digital video camera, a digital recorder, and an audio file player. Also, such wireless telephones can execute software applications, such as a web browser application that can be used to access the Internet. As such, these wireless telephones can include significant computing capabilities.

Some wireless telephones may be configured to communicate via more than one network, such as multiple networks associated with multiple subscriptions. For example, each subscription may be associated with a different wireless telephone number. When a wireless telephone is configured to communicate via more than one network, the wireless telephone may occasionally tune away from a first network to listen for data that may be received on one or more second networks. Tuning away in this manner can reduce data throughput of the first network. Additionally, tuning away uses power, decreasing overall efficiency of the wireless telephone.

SUMMARY

Systems and methods to control tuneaway time periods of mobile devices are disclosed. The systems and methods may be used in conjunction with wireless telephones and other mobile devices that support communication via multiple networks. For example, a wireless telephone or other mobile device may be referred to as a dual subscriber identity module (SIM) dual standby (DSDS) device when it is configured to support two SIMs. A DSDS device may register on two networks where each of the networks corresponds to one of the SIMs. After registering, the DSDS device may receive data, such as a packet stream or voice data, via either of the networks. While the DSDS device is receiving data from one network (e.g., a first network), the DSDS device may tuneaway to the other network (e.g., a second network) to determine whether paging information associated with the DSDS device is being sent via the other network. In a particular embodiment, the DSDS device may tuneaway to the other network less frequently than specified by a discontinuous reception (DRX) cycle of the other network. Tuning away from the first network while the data is being received via the first network interrupts the data transfer and reduces data throughput over a period of time. Thus, tuning away less frequently than specified by the DRX cycle may improve data throughput. Further, additional power is used each time a tuneaway process is performed. For example, power is used to decode paging information received from the other network to determine whether the paging information is related to the DSDS device. Thus, tuning away less frequently conserves power.

In a particular embodiment, a mobile device includes a processor and a receive/transmit (RX/TX) chain coupled to the processor. The RX/TX chain is operable to selectively communicate wirelessly via a first network based on a first wireless communication subscription and via a second network based on a second wireless communication subscription. The mobile device also includes a memory storing instructions that are executable by the processor to cause the processor to determine a tuneaway period associated with the second network that is longer than a discontinuous reception (DRX) cycle length associated with the second network. The tuneaway period specifies a length of time that data may be received by the RX/TX chain via the first network before the processor causes the RX/TX chain to tune to a paging channel of the second network to detect paging information from the second network.

In another particular embodiment, a method includes receiving first data via a first network at a device that is configured to receive the first data via the first network based on a first wireless communication subscription and is configured to receive second data via a second network based on a second wireless communication subscription. The method also includes, while receiving the first data, determining that a tuneaway period associated with the second network has passed, where the tuneaway period is longer than a discontinuous reception (DRX) cycle length associated with the second network. The method also includes tuning a receiver of the device to a paging channel of the second network in response to passing of the tuneaway period.

In another particular embodiment, a non-transitory computer-readable medium includes instructions that, when executed by a processor, cause the processor to perform a method. The method includes, while a device associated with the processor is receiving first data via a first network, determining that a tuneaway period associated with a second network has passed during reception of the first data, where the tuneaway period is longer than a discontinuous reception (DRX) cycle length associated with the second network. The device is configured to receive the first data via the first network based on a first wireless communication subscription and the device is configured to receive second data via the second network based on a second wireless communication subscription. The method also includes tuning a receiver of the device to a paging channel of the second network in response to passing of the tuneaway period to determine whether the second network is transmitting paging information associated with the device.

In another particular embodiment, an apparatus includes means for wirelessly communicating first data via a first network based on a first wireless communication subscription and for communicating second data via a second network based on a second wireless communication subscription. The apparatus also includes means for determining that a tuneaway period associated with the second network has passed during reception of the first data via the first network, where the tuneaway period is longer than a discontinuous reception (DRX) cycle length associated with the second network. The apparatus also includes means for tuning to a paging channel of the second network in response to passing of the tuneaway period.

One particular advantage provided by at least one disclosed embodiment is that power is conserved by reducing occurrences of tuneaway events. Another particular advantage provided by at least one disclosed embodiment is that background data throughput is improved by reducing occurrences of tuneaway events.

Other aspects, advantages, and features of the present disclosure will become apparent after review of the entire application, including the following sections: Brief Description of the Drawings, Detailed Description, and the Claims.

DETAILED DESCRIPTION

Figure 1:
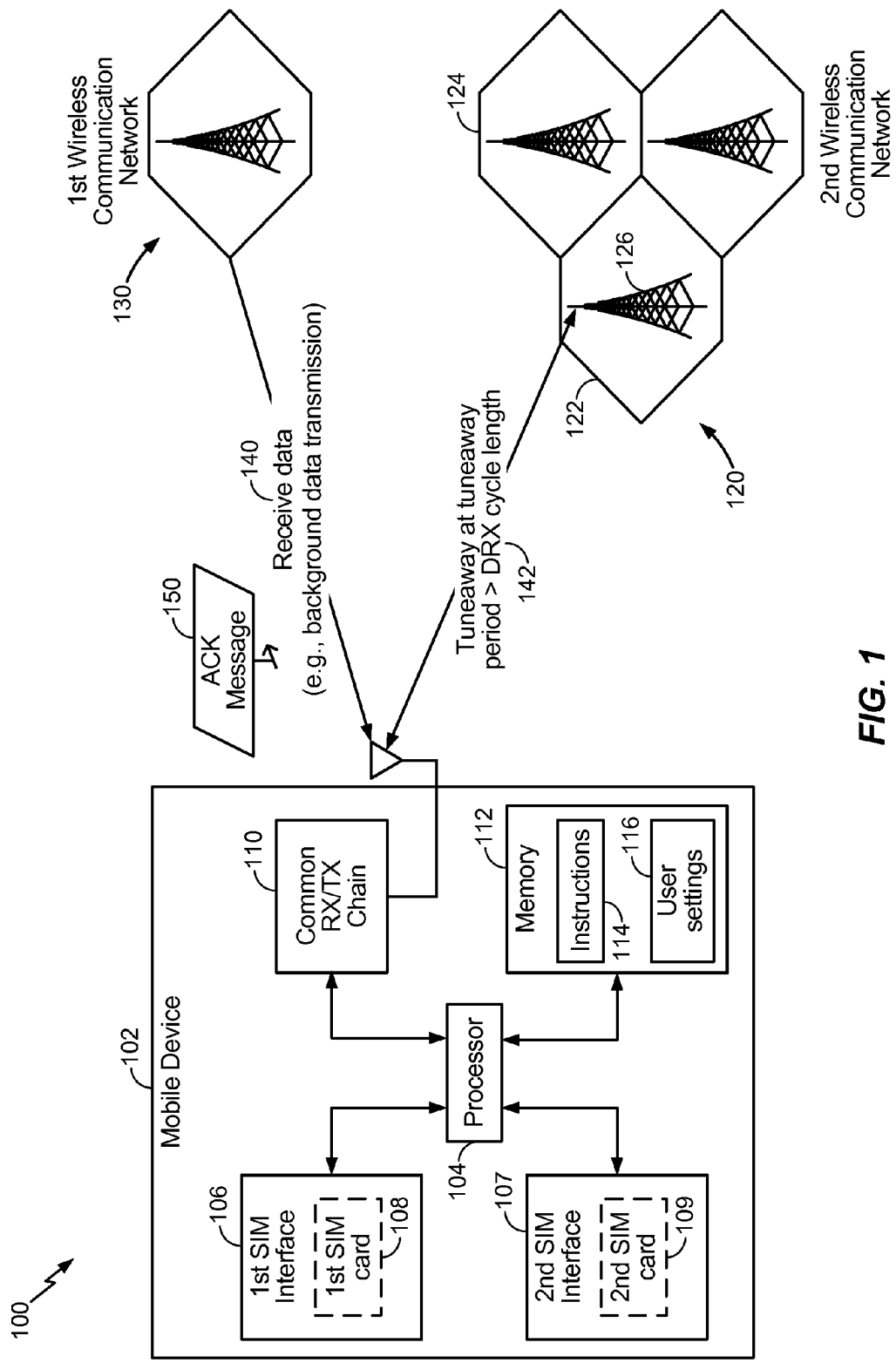
FIG. 1 is a diagram illustrating a particular embodiment of a system including a mobile device configured to communicate via two or more wireless networks.

FIG. 1 is a diagram illustrating a particular embodiment of a system 100 including a mobile device 102 configured to communicate via two or more wireless networks based on two or more wireless communication subscriptions, such as a first network 130 associated with a first wireless communication subscription and a second network 120 associated with a second wireless communication subscription. For example, the mobile device 102 may be a dual subscriber identity module (SIM) dual standby (DSDS) device.

The mobile device 102 may include two or more SIM interfaces, such as a first SIM interface 106 to receive and communicate with a first SIM card 108 associated with the first wireless communication subscription and a second SIM interface 107 to receive and communicate with a second SIM card 109 associated with the second wireless communication subscription. The SIM cards 108, 109 may store information used to facilitate communications via the networks 120, 130, such as subscriber identification, authentication information, subscription information, or any combination thereof. The networks 120, 130 may include a 3rd Generation Partnership Project (3GPP) Long Term Evolution (LTE) network, a Global System for Mobile Communications (GSM) network, a General Packet Radio Service (GPRS) network, an Enhanced Data rates for GSM Evolution (EDGE) network, a Universal Mobile Telecommunications System (UMTS) network, a GSM Radio Access Network (GRAN) network, a Code Division Multiple Access (CDMA) network, a CDMA-based data enhanced network (such as a 1×CDMA network or a 1× Evolution-Data Optimized (1×EV-DO) network), a Wideband CDMA (WCDMA) network, one or more other local or wide area wireless communication networks, or any combination thereof.

The mobile device 102 may also include a receive/transmit (RX/TX) chain 110 (including, for example, a transmitter, a receiver, a transceiver, other components, or a combination thereof) coupled to a processor 104. In a particular embodiment, a single RX/TX chain (e.g., the RX/TX chain 110) may selectively support communications via the first network 130 and the second network 120. For example, the RX/TX chain 110 may be operable to selectively communicate wirelessly via the two or more networks 120, 130. The RX/TX chain 110 may be configured to communicate via one network at a time, and the mobile device 102 may include a memory 112 that stores instructions 114 executable by the processor 104 to implement a "tuneaway" process. The tuneaway process may enable the mobile device 102 to communicate via the first network 130 (e.g., to receive data 140) and to occasionally tuneaway 142 from the first network 130 to the second network 120.

In a particular embodiment, the mobile device 102 is a data-enabled mobile communication device (such as a smart phone, a tablet computer, an electronic book reader, etc.). The mobile device 102 may be configured to receive data in the background (i.e., without direct user interaction or attention) via one or more of the networks 120, 130, such as the first network 130. For example, an application executing on the mobile device 102 may receive data in the background to update or synchronize the application or data associated with the application. The mobile device 102 may tuneaway from the first network 130 (interrupting reception of the data) to check for activity on the second network 120.

Tuning away from the first network 130 may interrupt the background data transfer. To reduce interruption of the background data transfer and to reduce power used by the tuneaway process, the mobile device 102 may tuneaway at intervals that are longer than a discontinuous reception (DRX) cycle length of the second network 120. For example, the mobile device 102 may determine a tuneaway period associated with at least a portion of the second network 120, such as a tuneaway period associated with a first cell 122 of the second network 120 or a second cell 124 of the second network 120. The tuneaway period may be determined based on how many times the second network 120 (or the portion of the second network 120) will repeat a page (e.g., a maximum number of page repeats) and based on the DRX cycle of the second network 120 or the portion of the second network 120. While receiving the background data from the first network 130 (and perhaps at other times), the mobile device 102 may tuneaway from the first network 130 to the second network 120 at intervals specified by the tuneaway period.

In operation, the mobile device 102 may tuneaway from the first network 130 to the second network 120 at or about expiration of the tuneaway period. The tuneaway period may be longer than the DRX cycle length associated with the second network 120. The tuneaway period may specify an amount of time that data, such as the background data or voice data, may be received by the RX/TX chain 110 via the first network 130 before the processor 104 causes the RX/TX chain 110 to tune to a paging channel of the second network 120 to detect paging information from the second network 120.

In a particular embodiment, the mobile device 102 may determine the tuneaway period that is to be used for the second network 120 or a portion of the second network 120. For example, the second network 120 may inform the mobile device 102 of the DRX cycle length used by the second network 120. To illustrate, the second network 120 may provide DRX cycle information to the mobile device 102 during a registration process. The DRX cycle length indicates how frequently the second network 120 will send paging information to the mobile device 102. Paging information may be sent from either network 120, 130 to notify the mobile device 102 of incoming communications associated with a corresponding wireless communication subscription that are directed to the mobile device 102 via the network. For example, when a call to a subscriber number associated with the second wireless communication subscription is received by the second network 120, the second network 120 may send a page to the mobile device 102. The mobile device 102 may use the DRX cycle length to determine a tuneaway period that specifies how frequently the mobile device 102 should tune to the second network 120 to determine whether the second network 120 is transmitting paging information associated with the second wireless communication subscription. To illustrate, if the DRX cycle length is one second, the second network 120 may update paging information transmitted via the paging channel of the second network 120 once per second. In a particular embodiment, the mobile device 102 is configured to tune away from the first network 130 to the second network 120 less frequently than the DRX cycle length to check for new paging information (e.g., less frequently than once per second in the example above) based on the tuneaway period.

The tuneaway period may be determined based at least partially on a maximum number of paging retries associated with at least a portion of the second network 120 (e.g., the first cell 122). The maximum number of paging retries may correspond to a number of times that a device (such as a base station via a tower, 126) of the first cell 122 retransmits paging information. In a particular embodiment, the mobile device 102 determines the maximum number of paging retries by monitoring paging transmissions of the first cell 122 over a period of time and counting a number of times that particular paging information is retransmitted during the period of time.

In a particular embodiment, a predetermined threshold number of page retries that are to be counted is stored in the memory 112. The instructions 114 may be executable by the processor 104 to set the maximum number of paging retries to the predetermined threshold number when the number of times that particular paging information is retransmitted during the period of time is at least equal to the predetermined threshold number. Thus, the predetermined threshold number may establish a maximum number of pages that the mobile device 102 is allowed to ignore. The predetermined threshold number may be a default value set to avoid significant delay in responding to pages. In a particular embodiment, the predetermined threshold number is user configurable. For example, the predetermined threshold number may be specified by data stored as user settings 116 in the memory 112. Delay in responding to pages may lead to delays in notifying a user of an incoming communication, which may lead to user dissatisfaction when the delay is significant. However, by making the predetermined threshold number user configurable, the user may determine how much delay in notification of incoming communication is acceptable. Further, the user may specify that no pages are to be ignored, causing the tuneaway period to be set to the DRX cycle length. In a particular embodiment, the predetermined threshold number may be set such that at most three pages are ignored.

The tuneaway period may be set to a lesser of the DRX cycle length times the predetermined threshold number and the DRX cycle length times the maximum number of paging retries. After determining the tuneaway period, the processor 104 may store the tuneaway period in the memory 112. In a particular embodiment, the memory stores tuneaway period data associated with a plurality of portions (e.g., cells) of the second network 120. For example, the memory 112 may include an identifier of the first cell 122 (such as a cell identification value) and tuneaway period data specifying the tuneaway period for the first cell 122. The memory 112 may also store tuneaway period data associated with one or more other cells of the second network 120, such as the second cell 124. When the mobile device 102 detects handoff of communications on the second network 120 from the first cell 122 to the second cell 124, the processor 104 may check the memory 112 to determine whether tuneaway period data specifying a tuneaway period associated with the second cell 124 is stored at the memory 112. When the tuneaway period data for the second cell 124 is stored in the memory 112, the processor 104 may implement the tuneaway process using the tuneaway period data associated with the second cell 124 while the mobile device 102 is in communication with the second cell 124.

In a particular embodiment, the memory 112 may also store expiry data associated with the tuneaway period data. The expiry data may indicate a time period during which the tuneaway period data is considered valid. In this embodiment, when the mobile device 102 detects handoff of communications to the second cell 124 and determines that tuneaway period data for the second cell 124 is stored in the memory 112, the processor 104 may determine whether the tuneaway period data is valid or expired based on the expiry data.

When the tuneaway period data associated with the second cell 124 is not stored at the memory 112, the processor 104 may determine the tuneaway period to be associated with the second cell 124. Similarly, when expired (or invalid) tuneaway period data associated with the second cell 124 is stored at the memory 112, the processor 104 may determine an updated tuneaway period to be associated with the second cell 124. The tuneaway data or updated tuneaway data associated with the second cell 124 may be determined as described above. For example, the tuneaway period associated with the second cell 124 may be set to a lesser of a predetermined multiple (e.g., the predetermined threshold number) of the DRX cycle length associated with the second network 120 (or associated with the second cell 124 of the second network 120) and a maximum number of paging retries of the second cell 124 multiplied by the DRX cycle length.

The tuneaway period or updated tuneaway period associated with the second cell 124 may be stored at the memory 112 as tuneaway period data. The tuneaway period data may be associated with an identifier of the second cell 124 and expiry data. Thus, at a subsequent time that the mobile device 102 is handed off to or is otherwise in communication with the second cell 124, the tuneaway period data for the second cell 124 may be available for access and use by the processor 104 to implement the tuneaway process.

In a particular embodiment, the mobile device 102 is configured to acknowledge packets received from first network 130 before tuning away to the second network 120. The first network 130 may specify to the mobile device 102 when acknowledgements are to be transmitted. For example, during a registration process, the first network 130 may notify the mobile device 102 when the mobile device 102 should send acknowledgement messages. The first network 130 may retransmit data packets that are not acknowledged within an acknowledgement period. In some circumstances, the acknowledgement period may pass while the mobile device 102 is tuned away to the second network 120. To prevent retransmission of data that was received by the mobile device 102 but not acknowledged before the mobile device tuned away to the second network 120, the mobile device 102 may send an acknowledgement message 150 to the first network 130 before tuning the RX/TX chain 110 to the paging channel of the second network 120. The acknowledgement message 150 may identify one or more data units received at the mobile device 102 from the first network 130. The acknowledgement message 150 may be sent at a time that is not specified by the first network 130 (e.g., prior to expiration of the acknowledgement period). The acknowledgement message may include a radio control link (RCL) status protocol data unit (PDU), a bitmap super-field, a piggy-backed super-field, or a combination thereof.

While the mobile device 102 is tuned to the first network 130 (e.g., to receive the data 140) the mobile device 102 may lose communication with the second network 120 (e.g., as a result of a communication error or timing out of or loss of synchronization of a radio communication link). In a particular embodiment, the mobile device 102 is configured to determine when communication with the second network 120 has been lost. In response to determining that the communication with the second network 120 has been lost, the processor 104 may attempt to reestablish communication with the second network 120. The instructions 114 may be executable by the processor to start a reconnect timer in response to determining that the communication with the second network 120 is lost. The reconnect timer may specify a maximum length of time that the mobile device may attempt to reestablish communication with the second network 120 before declaring loss of service from the second network 120 (e.g., notifying a user of the mobile device 102 that communication with the second network 120 has been lost). When the processor 104 detects expiry of the reconnect timer, the processor 104 may indicate loss of service from the second network 120. A duration of the reconnect timer may be determined based on a user configuration setting of the user settings 116 in the memory 112.

The processor 104 may initiate one or more tuneaway periods before expiry of the reconnect timer to attempt to reestablish the communication with the second network 120. During each tuneaway period of the one or more tuneaway periods, the mobile device 102 may tuneaway from the first network 130 to the second network 120 to attempt to reopen communication with the second network 120. A tuneaway timer may be initiated for each tuneaway period. The tuneaway timer for a particular tuneaway period specifies a maximum duration of the particular tuneaway period. The mobile device 102 suspends attempts to reconnect to the second network 120 and tunes back to the first network 130 in response to expiry of the tuneaway timer. A duration of the tuneaway timer may be determined based on a user configuration setting of the user settings 116. Alternately or in addition, the duration of the tuneaway timer may be determined based on a level of activity associated with the second network 120. The duration of the tuneaway timer may be variable between tuneaway periods of the one or more tuneaway periods.

The processor 104 may select a time to initiate each of the one or more tuneaway periods based on information related to the first network 130. For example, the processor 104 may select a time to initiate a particular tuneaway period of the one or more tuneaway periods based on information that indicates a level of activity associated with the first network 130. In another example, the processor 104 may select a time to initiate a particular tuneaway period of the one or more tuneaway periods based on when the first network has a predetermined state, such as a Cell_URA_PCH state, a Cell_FACH state, or a Cell_DCH state.

Although the particular embodiment illustrated in FIG. 1 includes two networks 120, 130, the system 100 may be used in conjunction with more than two networks. For example, the mobile device 102 may be associated with more than two wireless communication subscriptions and may be configured to communicate via more than two networks. The instructions 114 may be executable by the processor 104 to determine a tuneaway period associated with each of the networks. One or more of the tuneaway periods may be longer than a DRX cycle length of a corresponding network. Further, in the description above, the mobile device 102 has been described as tuning away from the first network 130 to the second network 120 merely for ease of description. The designations of "first network" and "second network" are arbitrary and may change based on circumstances or based on configuration of the networks 120, 130 or the mobile device 102. For example, when the data 140 is being received from the first network 130 by the mobile device 102, the mobile device 102 may tuneaway from the first network 130 to the second network 120 upon expiration of a tuneaway period that is longer than a DRX cycle associated with the second network 120. At another time, when other data (not shown) is being received from the second network 120 by the mobile device 102, the mobile device 102 may tuneaway from the second network 120 to the first network 130 upon expiration of a tuneaway period that is longer than a DRX cycle associated with the first network 130.

Figure 2:
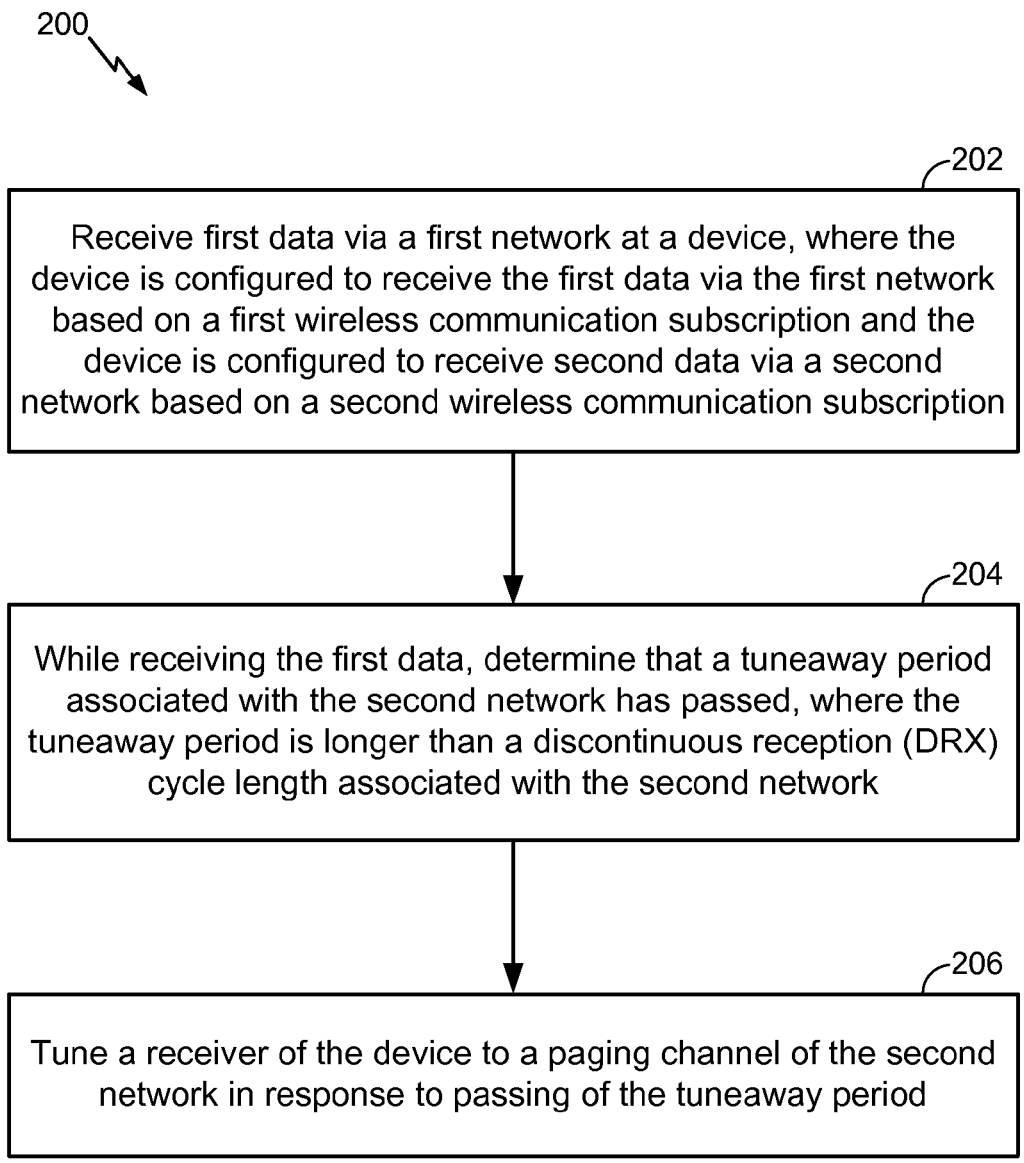
FIG. 2 is a flow diagram illustrating a particular embodiment of a method of tuning away at times according to a tuneaway period.

FIG. 2 is a flow diagram illustrating a particular embodiment of a method 200 of tuning away according to a tuneaway period. In an illustrative embodiment, the method 200 may be performed by the mobile device 102 of FIG. 1.

The method 200 may include, at 202, receiving first data via a first network at a device, wherein the device is configured to receive the first data via the first network based on a first wireless communication subscription and the device is configured to receive second data via a second network based on a second wireless communication subscription. The method 200 may also include, at 204, determining that a tuneaway period associated with the second network has passed (e.g. a tuneaway timer has expired) while receiving the first data. The tuneaway period may be longer than a single discontinuous reception (DRX) cycle length associated with the second network. For example, the device may use a timer to determine when the tuneaway period has passed. The timer may be configured to track time relative to the DRX cycle of the second network, for example, by keeping track of when each DRX cycle of the second network occurs based on passing of time. In this example, the tuneaway period may be specified as a number of DRX cycles.

The method 200 may further include, at 206, tuning a receiver of the device to a paging channel of the second network in response to passing of the tuneaway period. The receiver may be tuned to the paging channel of the second network to determine whether the second network is transmitting paging information associated with device. For example, the mobile device 102 of FIG. 1 may receive data 140 associated with a first wireless communication subscription via the first network 130. While receiving the data 140 from the first network 130, the mobile device 102 may determine that a tuneaway period associated with the second network 120 has passed, and the mobile device 102 may tuneaway 142 to the second network 120 to check for paging information.

Figure 3:
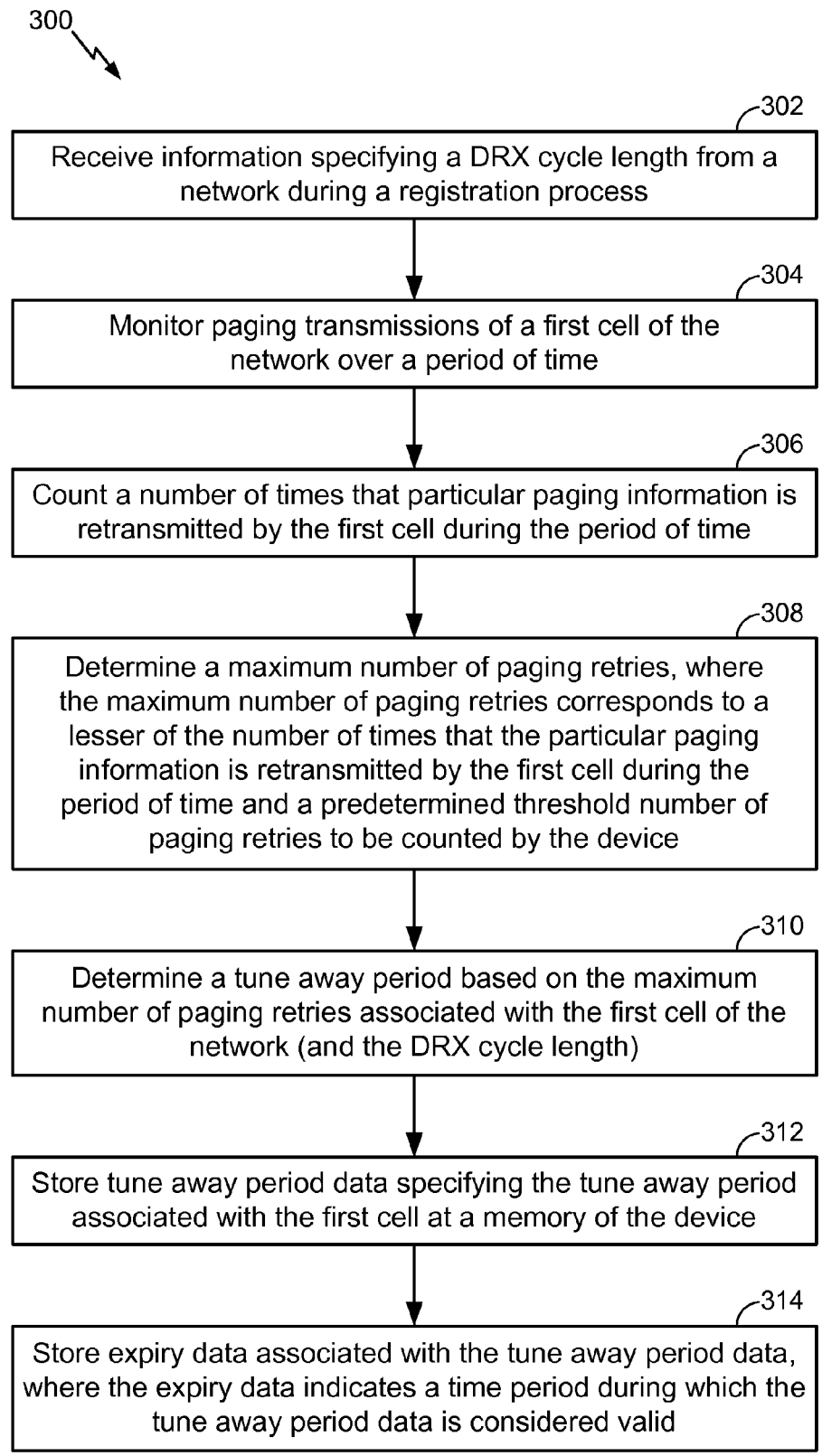
FIG. 3 is a flow diagram illustrating a particular embodiment of a method of setting a tuneaway period.

FIG. 3 is a flow diagram illustrating a particular embodiment of a method 300 of setting a tuneaway period. In an illustrative embodiment, the method 300 may be performed by the mobile device 102 of FIG. 1. For example, the method 300 may be performed by a DSDS device that is configured to selectively communicate via a first network based on a first wireless communication subscription and via a second network based on a second wireless communication subscription.

The method 300 may include, at 302, receiving, at a mobile device, information specifying a DRX cycle length from a network. For example, the second network 120 of FIG. 1 may send information specifying a DRX cycle length associated with the second network 120 (or of a portion of the second network 120) to the mobile device 102. The information specifying a DRX cycle length may be received during a registration process or via a subsequent communication.

The method 300 may also include, at 304, monitoring paging transmissions of a first cell of the network over a period of time, and, at 306, counting a number of times that particular paging information is retransmitted by the first cell during the period of time. The method 300 may include, at 308, determining a maximum number of paging retries associated with the network or associated with the first cell of the network. The maximum number of paging retries may correspond to a lesser of the number of times that the particular paging information is retransmitted by the first cell during the period of time and a predetermined threshold number of paging retries to be counted by the mobile device. The method 300 may include, at 310, determining a tuneaway period based on the maximum number of paging retries associated with the network or associated with the first cell of the network, based on the DRX cycle length associated with the network or the first cell of the network, or based on both the maximum number of paging retries and the DRX cycle length.

The method 300 may include, at 312, storing tuneaway period data specifying the tuneaway period associated with the network or the first cell of the network at a memory of the mobile device. For example, the tuneaway period data may be stored at the memory 112 of the mobile device 102 of FIG. 1. Expiry data associated with the tuneaway period data may also be stored at the memory, at 314. The expiry data may indicate a time period during which the tuneaway period data is considered valid.

Figure 4:
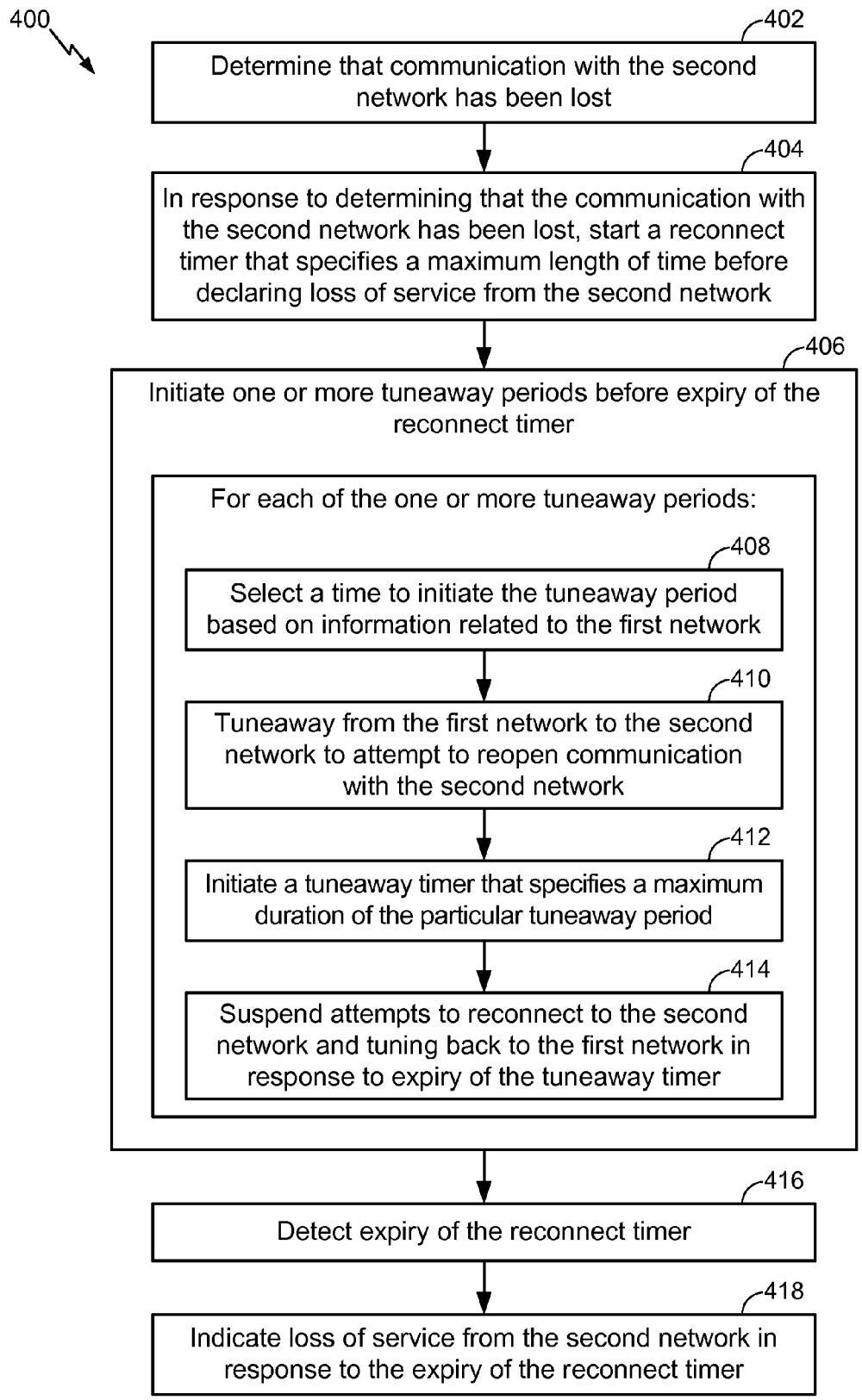
FIG. 4 is a flow diagram illustrating a particular embodiment of a method of tuning away to reestablish communication with a network.

FIG. 4 is a flow diagram illustrating a particular embodiment of a method 400 of tuning away to reestablish communication with a network. In an illustrative embodiment, the method 400 may be performed by the mobile device 102 of FIG. 1. For example, the method 400 may be performed by a DSDS device that is configured to selectively communicate via a first network based on a first wireless communication subscription and via a second network based on a second wireless communication subscription.

The method 400 includes, at 402, determining that communication with the second network has been lost. The method 400 may also include, in response to determining that communication with the second network has been lost, starting a reconnect timer that specifies a maximum length of time before declaring loss of service from the second network, at 404. A duration of the reconnect timer may be determined based on user configuration settings.

One or more tuneaway periods may be initiated before expiry of the reconnect timer, at 406. For each of the one or more tuneaway periods, the method 400 may include selecting a time to initiate the tuneaway period based on information related to the first network, at 408. For example, at least one of the one or more tuneaway periods may be initiated when the first network has a predetermined state such as a Cell_URA_PCH state, a Cell_FACH state, or a Cell_DCH state. In another example, at least one of the one or more tuneaway periods may be initiated based on a level of activity associated with the first network.

Also, for each of the one or more tuneaway periods, the method 400 may include tuning away from the first network to the second network to attempt to reopen communication with the second network, at 410, and initiating a tuneaway timer that specifies a maximum duration of the particular tuneaway period, at 412. A duration of the tuneaway timer may be variable between tuneaway periods of the one or more tuneaway periods. For example, the duration of the tuneaway timer for each tuneaway period may be determined based on a level of activity associated with the second network, based on a user configuration setting, or a combination thereof.

If communication is reestablished, then the method 400 ends and communication and tuneaway control is performed as described with reference to FIGS. 1-3. If communication is not reestablished during a particular tuneaway period, attempts to reconnect to the second network are suspended in response to expiry of the tuneaway timer and a RX/TX chain is tuned back to the first network, at 414.

When attempts to reconnect to the second network are not successful, the method may include detecting expiry of the reconnect timer, at 416. In response to expiry of the reconnect timer, the method 400 includes indicating loss of service from the second network, at 418.

Figure 5:
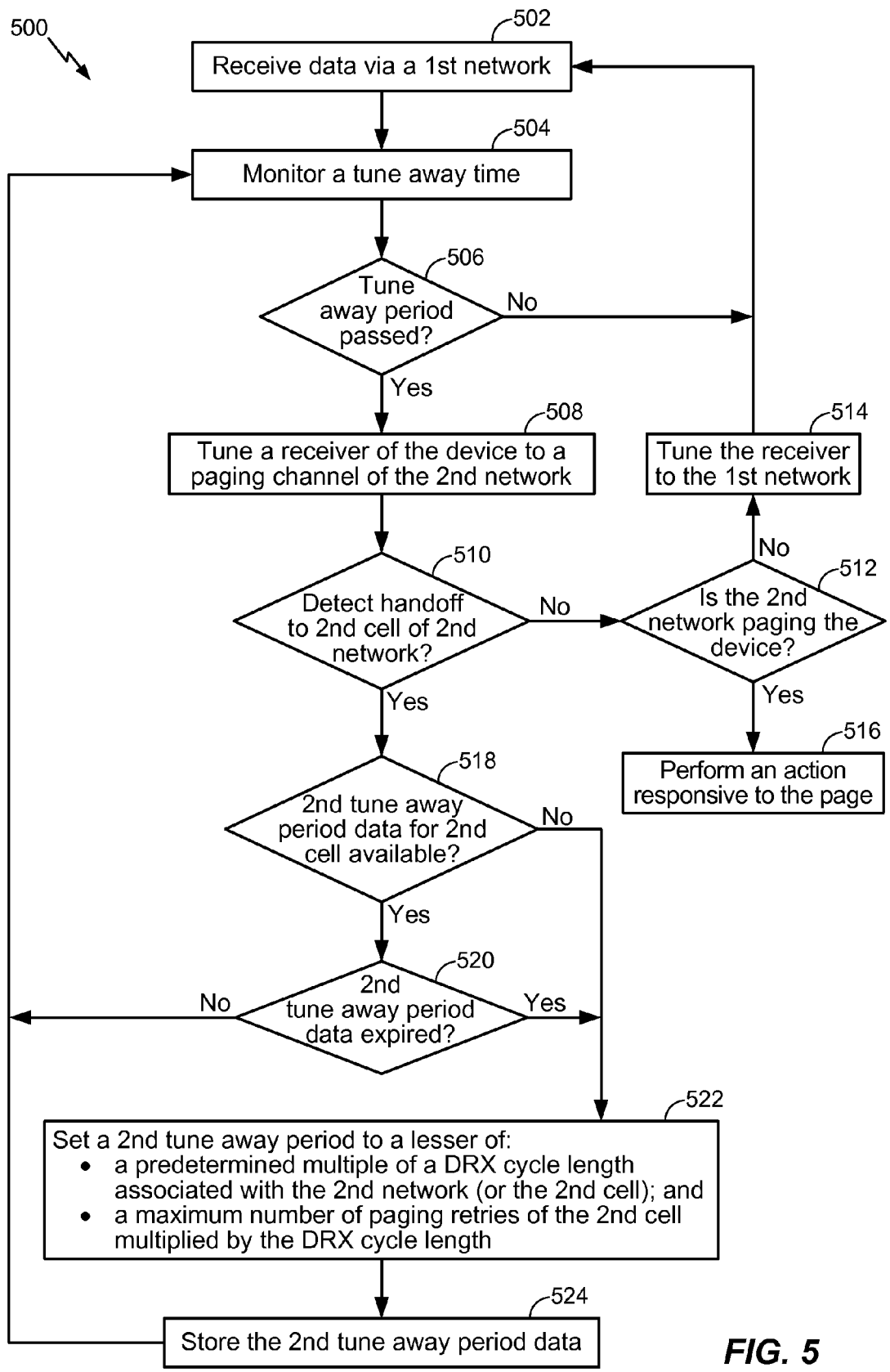
FIG. 5 is a flow diagram illustrating a particular embodiment of a method of tuning away at times according to a tuneaway period.

FIG. 5 is a flow diagram illustrating a particular embodiment of a method 500 of tuning away according to a tuneaway period. In an illustrative embodiment, the method 500 may be performed by the mobile device 102 of FIG. 1. For example, the method 500 may be performed by a DSDS device that is configured to selectively communicate via a first network based on a first wireless communication subscription and via a second network based on a second wireless communication subscription.

The method 500 may include, at 502, receiving data (such as a background data stream) via the first network at a device (such as the mobile device 102 of FIG. 1). The method 500 may include, at 504, monitoring a tuneaway time associated with the second network. For example, the device may keep track of an amount of time that has passed since a previous tuneaway to the second network. The device may continue receiving data via the first network until a determination is made, at 506, that a tuneaway period has passed.

When the tuneaway period has passed, a receiver of the device may be tuned to a paging channel of the second network, at 508. The second network may communicate paging information to the device via the paging channel. After the device is in communication with the second network (e.g., tuned to the padding channel of the second network), the device determines, at 510, whether a handoff of communications from a first cell of the second network to a second cell of the second network has occurred. When no handoff has occurred, a determination may be made, at 512, whether the second network is paging the device. When the second network is not paging the device, the receiver may be tuned to the first network, at 516. When the second network is paging the device, the device may perform an action responsive to the page, at 516. For example, the device may send a reply message responsive to the page.

In a particular embodiment (not illustrated in FIG. 5), the method 500 includes, after detecting handoff of communication to the second cell, determining whether the second network is paging the device via the second cell and performing an action responsive to the page when the second cell of the second network is paging the device.

In response to detecting handoff to the second cell, a determination may be made, at 518, whether second tuneaway period data specifying a second tuneaway period associated with the second cell is stored at a memory of the device. When the second tuneaway period data is stored at the memory, a determination may be made whether the second tuneaway period data has expired (e.g., not valid), at 520. In response to determining that the second tuneaway period data is not stored at the memory, at 518, or in response to determining that the second tuneaway period data stored at the memory has expired (e.g., not valid), at 520, the second tuneaway period may be set, at 522. The second tuneaway period may be set to a lesser of a predetermined multiple of a DRX cycle length associated with the second network (or the second cell) and a maximum number of paging retries of the second cell multiplied by the DRX cycle length. The second tuneaway period data (and an identifier of the second cell) may be stored at the memory of the device, at 526. After the device tunes back to the first network, the second tuneaway period may be used to monitor the tuneaway time, at 506, to determine when to tuneaway from the first network to the second cell of the second network to determine whether the second network is paging the device.

Thus, the method 500 enables determination of a tuneaway period that is longer than a DRX cycle length of a network, such as the second network 120 of FIG. 1. Setting the tuneaway period to be longer that the DRX cycle length of the network may improve data throughput at a mobile device and may reduce power consumption at the mobile device. The tuneaway period may be determined in a manner that reduces a risk of the mobile device missing paging information since the tuneaway period accounts for how many times a particular cell of the network repeats the paging information. Additionally, since different cells of the network may repeat the paging information a different number of times, the method 500 may enable determination of different tuneaway periods for each cell of the network that is utilized by the mobile device.

Figure 6:
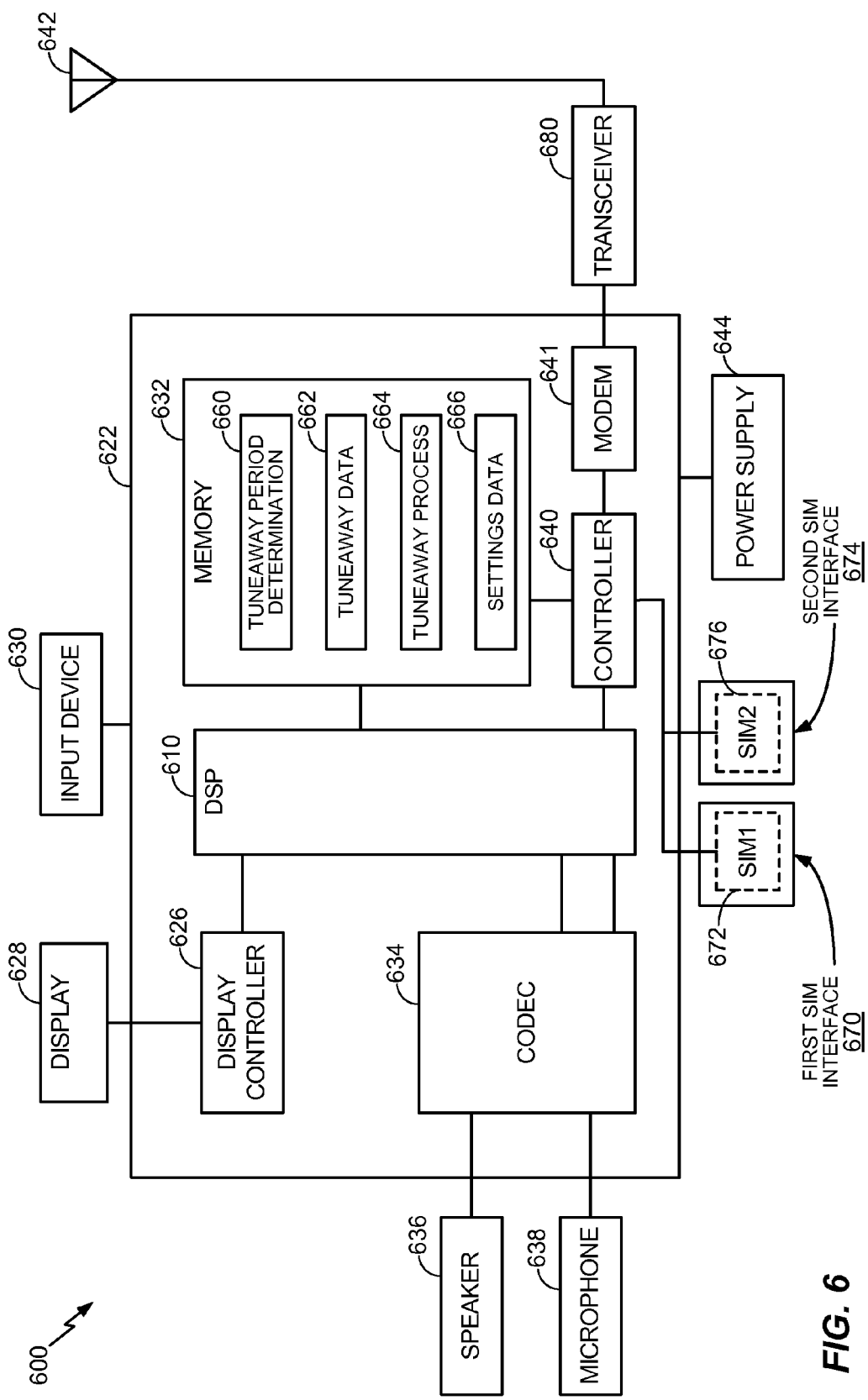
FIG. 6 is a block diagram of a mobile communication device that supports communication via multiple networks.

FIG. 6 is a block diagram of a mobile communication device 600 that supports communication via two or more wireless networks based on two or more wireless communication subscriptions. In one embodiment, the mobile communication device 600 or components thereof include or are included within the mobile device 102 of FIG. 1. Further, all of or part of the methods described with reference to FIGS. 2-5 may be performed at or by the mobile communication device 600.

The mobile communication device 600 includes a processor, such as a digital signal processor (DSP) 610, coupled to a memory 632. In the embodiment illustrated in FIG. 6, the mobile communication device 600 includes a first SIM interface 670 and a second SIM interface 674. The first SIM interface 670 may be configured to receive a first SIM card 672 that is associated with a first wireless communication subscription, and the second SIM interface 674 may be configured to receive a second SIM card 676 that is associated with a second wireless communication subscription. For example, at least one of the SIM interfaces 670, 674 may be a SIM card connector that includes a body having an accommodating space for a SIM card and multiple connected-through receptacles for receiving conducting terminals of a received SIM card. An electrical signaling contact may be made with the SIM card through the conducting terminals and the receptacles. An example interface may include a serial or parallel (e.g., 6-pin or 8-pin) connection. Further, multiple SIM card sizes may be accommodated (e.g., full-size, mini-SIM, or micro-SIM).

At least one of the SIM interfaces 670, 674 may include or be coupled to other electronics, such as a controller 640, that facilitate communication between the digital signal processor 610 and the SIM cards 672, 676. The controller 640 may also be coupled to a modem 641 and to a transceiver 680 that are adapted to communicate wirelessly with two or more networks corresponding to two or more wireless communication subscriptions via at least one antenna 642. The controller 640 or the digital signal processor 610 may arbitrate or otherwise control access to a single RX/TX chain, which may include, for example, the modem 641, the transceiver 680, and the antenna 642. The RX/TX chain may also include other signal processing components (not shown). Thus, the RX/TX chain (or portions thereof) may include means to communicate wirelessly via multiple wireless networks. The controller 640 or the digital signal processor 610 may control tuning of the RX/TX chain, or portions thereof, from one wireless communication network to another wireless communication network. For example, while data is being received via a first network, the controller 640 or the digital signal processor 610 may monitor a tuneaway time by executing tuneaway process instructions 664 stored in a memory 632. When the tuneaway time has passed, the controller 640 or the digital signal processor 610 may cause the RX/TX chain to tune to a paging channel of a second network to check for paging information associated with the mobile communication device 600. Thus, the controller 640, the digital signal processor 610, or both, may include means to determine that a tuneaway period associated with the first network has passed during reception of data via the first network and means to tuneaway from the first network to the paging channel of the second network in response to passing of the tuneaway period.

The mobile communication device 600 may include a display controller 626 that is coupled to the digital signal processor 610 and to a display 628. A coder/decoder (CODEC) 634 can also be coupled to the digital signal processor 610. A speaker 636 and a microphone 638 can be coupled to the CODEC 634.

The memory 632 may be a tangible, non-transitory, computer-readable storage medium that stores instructions. The instructions may be executable by the digital signal processor 610 to perform one or more functions or methods described herein. For example, the memory 632 may include tuneaway period determination instructions 660 that are executable by the digital signal processor 610 to determine a tuneaway period (e.g., based on a DRX cycle length of a network and a maximum number of paging retries associated with the network). The memory 632 may also store tuneaway data 662, which may include data specifying tuneaway periods associated with one or more networks or portions of the one or more networks, identifiers of portions of the networks (e.g., cell identifies), DRX information associated with the one or more networks, expiry data associated with the tuneaway periods, other data used to perform a tuneaway process or to determine a tuneaway period, or any combination thereof. The memory 632 may also include the tuneaway process instructions 664 that are executable by the digital signal processor 610 to implement the tuneaway process (e.g., to tuneaway from the first network to the second network upon passing of a tuneaway period associated with the second network). The memory 632 may also include settings data 666. The settings data 666 may include user configurable settings, default or factory settings, or both. The settings data 666 may specify information that is used by the tuneaway period determination instructions 660 to determine the tuneaway period. For example, the settings data 666 may indicate a maximum number of paging retries to be counted to determine the tuneaway period. The settings data 666 may also or in the alternative specify information that is used by the tuneaway process 664 to attempt to reestablish communication with a network when communication with the network is lost. For example, the settings data 666 may indicate a duration of a tuneaway timer, a duration of a reconnect timer, or both.

In a particular embodiment, the digital signal processor 610, the display controller 626, the memory 632, the CODEC 634, the controller 640, and the modem 641 are included in a system-in-package or system-on-chip device 622. In a particular embodiment, an input device 630 and a power supply 644 are coupled to the system-on-chip device 622. Moreover, in a particular embodiment, as illustrated in FIG. 6, the display 628, the input device 630, the speaker 636, the microphone 638, the antenna 642, the transceiver 680, the power supply 644, the first SIM interface 670, and the second SIM interface 674 are external to the system-on-chip device 622. However, each of the display 628, the input device 630, the speaker 636, the microphone 638, the antenna 642, the transceiver 680, the power supply 644, the first SIM interface 670, and the second SIM interface 674 can be coupled to a component of the system-on-chip device 622, such as an interface or a controller.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In conjunction with the described embodiments, an apparatus is disclosed that includes means for wirelessly communicating first data via a first network based on a first wireless communication subscription and for communicating second data via a second network based on a second wireless communication subscription. For example, the means for wirelessly communicating the first data via the first network based on the first wireless communication subscription and to communicate the second data via the second network based on the second wireless communication subscription may include the mobile device 102 of FIG. 1 or one or more components thereof (e.g., the RX/TX chain 110, the processor 104, or the SIM interfaces 106, 107). Additionally or in the alternative, the means for wirelessly communicating the first data via the first network based on the first wireless communication subscription and for communicating the second data via the second network based on the second wireless communication subscription may include the mobile communication device 600 of FIG. 6 or one or more components thereof (e.g., the transceiver 680, the modem 641, the controller 640, the SIM interfaces 670, 674, or the DSP 610).

The apparatus also includes means for determining that a tuneaway period associated with the second network has passed during reception of the first data via the first network, where the tuneaway period is longer than a discontinuous reception (DRX) cycle length associated with the second network. For example, the means for determining that the tuneaway period associated with the second network has passed during reception of the first data via the first network may include the mobile device 102 of FIG. 1 or one or more components thereof (e.g., the processor 104 or the instructions 114). Additionally or in the alternative, the means for determining that the tuneaway period associated with the second network has passed during reception of the first data via the first network may include the mobile communication device 600 of FIG. 6 or one or more components thereof (e.g., the controller 640, the DSP 610, or the tuneaway process 664).

The apparatus also includes means for tuning to a paging channel of the second network in response to passing of the tuneaway period. For example, the means for tuning to the paging channel of the second network in response to passing of the tuneaway period may include the mobile device 102 of FIG. 1 or one or more components thereof (e.g., the RX/TX chain 110, the processor 104, or the SIM interfaces 106, 107). Additionally or in the alternative, the means for tuning to the paging channel of the second network in response to passing of the tuneaway period may include the mobile communication device 600 of FIG. 6 or one or more components thereof (e.g., the transceiver 680, the modem 641, the controller 640, the SIM interfaces 670, 674, or the DSP 610).

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transitory storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal (e.g., a mobile phone or a PDA). In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments disclosed herein but is to be accorded the widest scope possible consistent with the principles and novel features as defined by the following claims.

What is claimed is:

1. A method comprising:
   receiving first data via a first network at a device, wherein the device is configured to receive the first data via the first network based on a first wireless communication subscription and the device is configured to receive second data via a second network based on a second wireless communication subscription;
   determining a tueaway period associated with the second network based at least in part on monitoring a number of transmissions of particular paging information by at least a first componet of the second network, wherein the tuneaway period is longer than a discontinuous reception (DRX) cycle length associated with the second network;

while reciving the first data, determing that the tuneaway period associated with the second network has ended; and tuning a reciver of the device to a paging channel of the second network in response to the ending of the tuneaway period;

wherein the number of transmissions of the particular paging information corresponds to a number of paging retries associated with at least the first componets of the second network.

2. The method of claim 1, wherein determining the tuneaway period comprises:

monitoring paging transmissions of the first component of the second network over a period of time;

counting the number of transmissions of the particular paging information by the first component during the period of time; and determining a number of paging retries, wherein the number of paging retries corresponds to a lesser of:

the number of transmissions of the particular paging information by the first component during the period of time; and a threshold number of paging retries.

3. The method of claim 1, wherein the tuneaway period is determined further based on the DRX cycle length associated with the second network.

4. The method of claim 1, further comprising storing tuneaway period data specifying the tuneaway period at a memory of the device.

5. The method of claim 4, further comprising:

storing expiry data associated with the tuneaway period data, wherein the expiry data indicates a time period during which the tuneaway period data is considered valid; and determining an updated tuneaway period after passing of the time period indicated by the expiry data.

6. The method of claim 1, further comprising:

detecting handoff of communications with the device from the first component of the second network to a second component of the second network;

in response to detecting the handoff, determining whether second tuneaway period data specifying a second tuneaway period associated with the second component is stored at a memory of the device;

in response to determining that the second tuneaway period data is not stored at the memory or in response to determining that the second tuneaway period data stored at the memory is expired, setting the second tuneaway period to a lesser of:

a multiple of the DRX cycle length associated with the second network; and a maximum number of paging retries of the second component multiplied by the DRX cycle length associated with the second network; and storing the second tuneaway period data and an identifier of the second component at the memory.

7. The method of claim 1, further comprising:

determining that communication with the second network has been lost;

in response to determining that the communication with the second network has been lost, starting a reconnect timer that specifies a maximum length of time before declaring loss of service from the second network; and tuning away from the first network during one or more tuneaway periods associated with the first network before expiry of the reconnect timer.

8. The method of claim 7, further comprising:

detecting expiry of the reconnect timer; and indicating loss of service from the second network in response to the expiry of the reconnect timer.

9. The method of claim 7, further comprising, during each particular tuneaway period of the one or more tuneaway periods:

tuning away from the first network to the second network to attempt to reopen communication with the second network;

initiating a tuneaway timer that specifies a maximum duration of the particular tuneaway period; and suspending attempts to reconnect to the second network and tuning back to the first network in response to expiry of the tuneaway timer.

10. The method of claim 9, further comprising selecting a time to tune away from the first network during each of the one or more tuneaway periods based on information related to the first network.

11. The method of claim 10, wherein the information related to the first network indicates a level of activity associated with the first network.

12. The method of claim 10, wherein the time to initiate the particular tuneaway period is selected when the first network has a particular state.

13. The method of claim 9, wherein a duration of the tuneaway timer is determined based on a level of activity associated with the second network.

14. The method of claim 9, wherein a duration of the tuneaway timer is determined based on a user configuration setting.

15. The method of claim 9, wherein a duration of the tuneaway timer is variable between tuneaway periods of the one or more tuneaway periods.

16. The method of claim 7, wherein a duration of the reconnect timer is determined based on a user configuration setting.

17. A mobile device comprising:

a processor;

a receive/transmit (RX/TX) chain coupled to the processor and operable to selectively communicate wirelessly via a first network based on a first wireless communication subscription and via a second network based on a second wireless communication subscription; and a memory storing instructions that are executable by the processor to cause the processor to:

determine a tuneaway period associated with the second network based at least in part on monitoring a number of transmissions of particular paging information by at least a first component of the second network, wherein the tuneaway period is longer than a discontinuous reception (DRX) cycle length associated with the second network, and wherein the tuneaway period specifies a length of time that data may be received by the RX/TX chain via the first network before the processor causes the RX/TX chain to tune to a paging channel of the second network to detect paging information from the second network;

wherein the number of transmissions of the particular paging information corresponds to a number of paging retries associated with at least the first component of the second network.

18. The mobile device of claim 17, wherein:
determining the tuneaway period comprises:
- determining a number of paging retries that corresponds to a lesser of:
  - the number of transmissions of particular paging information by the first component of the second network during a period of time; and
  - a threshold number of paging retries; and
the instructions are further executable by the processor to store tuneaway period data specifying the tuneaway period associated with the first component at the memory.

19. The mobile device of claim 17, wherein the instructions are further executable by the processor to:
- detect handoff of communications from a first component of the second network to a second component of the second network;
- in response to detecting the handoff, determine whether valid second tuneaway period data specifying a second tuneaway period associated with the second component is stored at the memory;
- in response to determining that the valid second tuneaway period data is not stored at the memory, set the second tuneaway period to a lesser of:
  - a multiple of the DRX cycle length associated with the second network; and
  - a maximum number of paging retries of the second component multiplied by the DRX cycle length associated with the second network; and
- store the second tuneaway period data and an identifier of the second component at the memory.

20. The mobile device of claim 17, wherein the instructions are further executable by the processor to:
- determine that communication with the second network has been lost;
- in response to determining that the communication with the second network has been lost, start a reconnect timer that specifies a maximum length of time before declaring loss of service from the second network; and
- tune away from the first network during one or more tuneaway periods associated with the first network before expiry of the reconnect timer.

21. A non-transitory computer-readable medium comprising instructions that, when executed by a processor, cause the processor to perform a method comprising:
- while a device associated with the processor is receiving first data via a first network, determining that a tuneaway period associated with a second network has passed wherein the tuneaway period is longer than a discontinuous reception (DRX) cycle length associated with the second network, wherein the device is configured to receive the first data via the first network based on a first wireless communication subscription and the device is configured to receive second data via the second network based on a second wireless communication subscription; and
- while the device associated with the processor is receiving the first data via the first network, tuning a receiver of the device to a paging channel of the second network in response to passing of the tuneaway period to determine whether the second network is transmitting paging information associated with the device;
- wherein the number of transmissions of the particular paging information corresponds to a number of paging retries associated with at least the first component of the second network.

22. An apparatus comprising:
- means for wirelessly communicating first data via a first network based on a first wireless communication subscription and for communicating second data via a second network based on a second wireless communication subscription;
- means for determining a tuneaway period associated with the second network based at least in part on monitoring a number of transmissions of particular paging information by at least a first component of the second network, wherein the tuneaway period is longer than a discontinuous reception (DRX) cycle length associated with the second network;
- means for determining that a tuneaway period associated with the second network has passed during reception of the first data via the first network, and
- means for tuning to a paging channel of the second network in response to passing of the tuneaway period;
- wherein the number of transmissions of the particular paging information corresponds to a number of paging retries associated with at least the first component of the second network.

* * * * *